United States Patent [19]

Jehan et al.

[11] Patent Number: 5,752,695
[45] Date of Patent: May 19, 1998

[54] FILM SAMPLE POSITIONING APPARATUS

[75] Inventors: Howard Paul Jehan, Honeoye Falls; L. Charles Burgwardt, Rochester, both of N.Y.

[73] Assignee: Eastman Kodak Company, Rochester, N.Y.

[21] Appl. No.: 629,298

[22] Filed: Apr. 8, 1996

[51] Int. Cl.$^6$ .................................................. B65H 5/08
[52] U.S. Cl. .................. 271/14; 271/31.1; 271/225; 271/268; 414/744.4; 414/774; 414/783; 414/789.9
[58] Field of Search .................. 271/11, 14, 267, 271/268, 225, 31.1; 414/737, 744.4, 774, 783, 789.9, 744.2, 744.6, 744.8; 209/583, 584

[56] References Cited

U.S. PATENT DOCUMENTS

| | | | |
|---|---|---|---|
| 2,235,377 | 3/1941 | Laxo | 153/2 |
| 2,378,306 | 4/1945 | Leonhart | 271/32 |
| 2,796,256 | 6/1957 | Robertson | 271/11 |
| 3,760,956 | 9/1973 | Burch | 414/744.8 |
| 3,834,555 | 9/1974 | Bennington | 414/744.6 X |
| 3,904,255 | 9/1975 | Lightner | 23/253 |
| 4,361,062 | 11/1982 | Reiff | 271/14 X |
| 4,394,011 | 7/1983 | Dalton | 271/107 |
| 4,418,906 | 12/1983 | Scott | 271/99 |
| 4,776,743 | 10/1988 | Kimsra | 271/268 X |
| 5,031,892 | 7/1991 | Stieger | 271/10 |
| 5,161,791 | 11/1992 | Akiyama et al. | 271/12 |
| 5,195,732 | 3/1993 | Focke | 271/11 |
| 5,253,855 | 10/1993 | Torisawa | 271/9 |
| 5,279,696 | 1/1994 | Zangenfeind et al. | 156/354 |
| 5,350,166 | 9/1994 | Shimizu et al. | 271/14 |
| 5,368,286 | 11/1994 | Horsman et al. | 271/11 |
| 5,407,187 | 4/1995 | Reil et al. | 271/14 |
| 5,442,163 | 8/1995 | Nakahara et al. | 235/381 |

FOREIGN PATENT DOCUMENTS

| | | |
|---|---|---|
| 0 073 185 | 4/1985 | European Pat. Off. |
| 0 266 056 A1 | 8/1988 | European Pat. Off. |
| 0 412 945 B1 | 4/1994 | European Pat. Off. |
| 2725831 | 2/1979 | Germany ............ 271/14 |
| 013915 | 7/1993 | WIPO ................ 414/737 |

*Primary Examiner*—Boris Milef
*Attorney, Agent, or Firm*—Mark G. Bocchetti

[57] ABSTRACT

An apparatus for handling and automatically positioning film samples such that individual film samples can be retrieved from a magazine and moved precisely to a position where a subsequent operation can be performed such as the reading thereof by a densitometer. Individual samples are acquired from the magazine by means of a vacuum pad supported on a rotatable arm. Once acquired, the sample is repositioned in a horizontal plane through rotation of the arm. A second arm is moved into position such that clamping jaws grasp one end of the sample. Once the sample has been grasped by the clamping jaws, the sample is released from the vacuum pad. The second arm which is rotatable in a horizontal plane is mounted on a linear slide such that through operation of the linear slide and rotation of the arm, the acquired film sample can be automatically and precisely positioned through computer control thereof. Once a sample has been read, the sample is automatically discarded and a new sample is acquired by the vacuum pad.

22 Claims, 7 Drawing Sheets

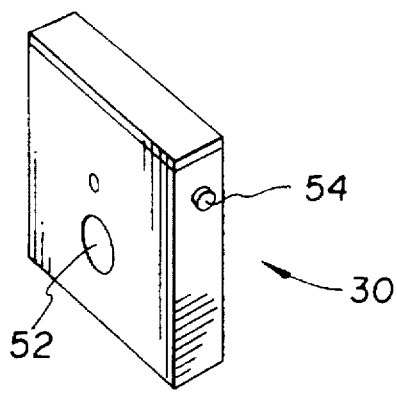
FIG. 5
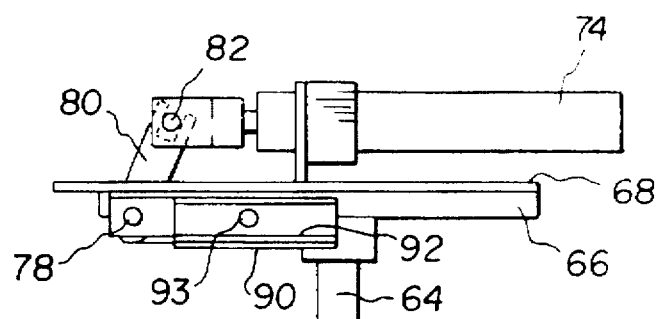
FIG. 6
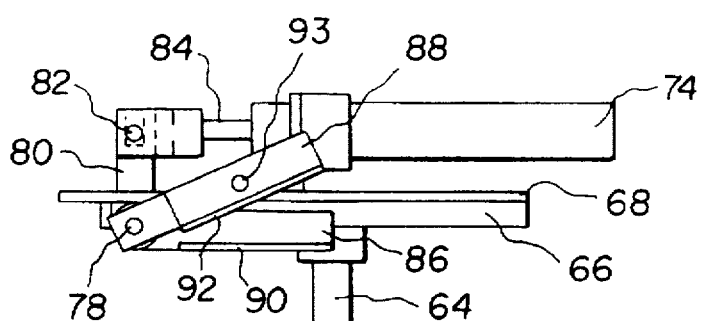
FIG. 7
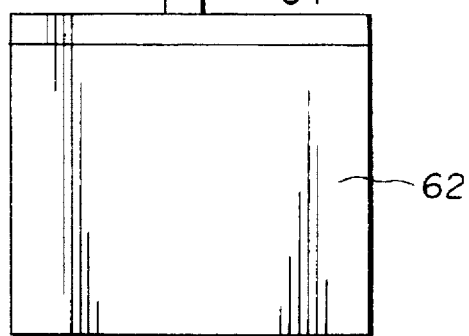

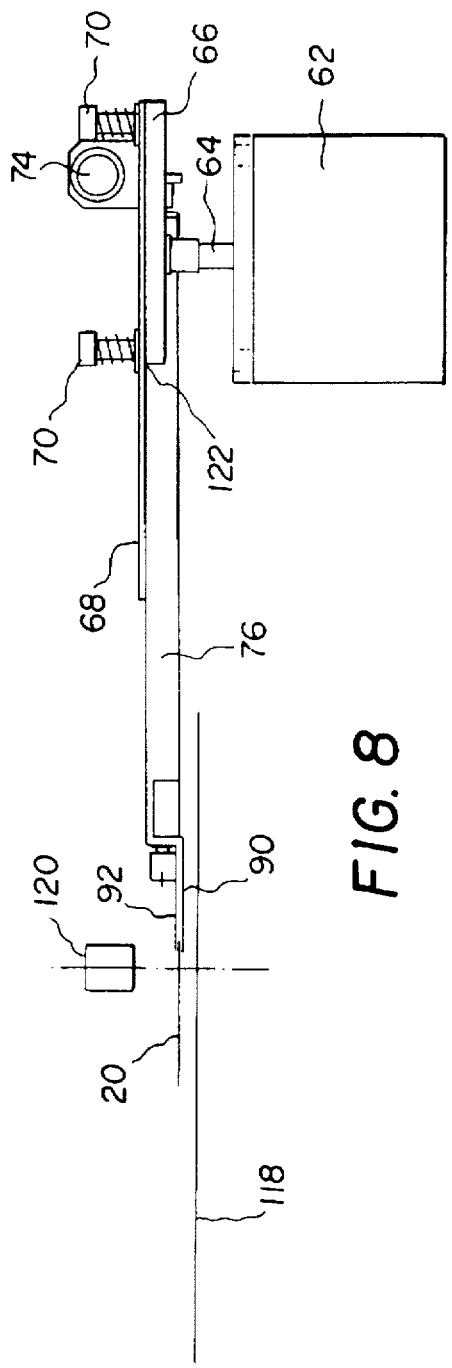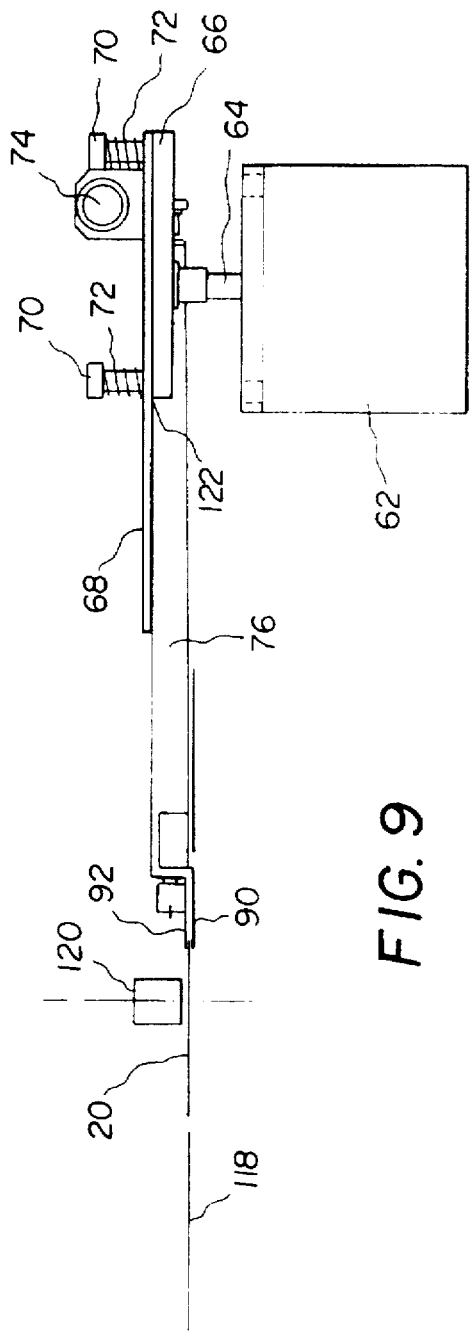

FILM SAMPLE POSITIONING APPARATUS

BACKGROUND OF THE INVENTION

1. Field of the Invention

The present invention relates generally to film sample handling devices, and, more particularly, to automated systems or retrieving film dosimetry samples and positioning such samples for dosimetric readings.

2. Brief Description of the Prior Art

Film dosimetry is a science that uses a film product similar to dental X-ray film to record exposure to radioactive sources. The procedure for testing the performance of suppliers of dosimetry services for personnel potentially exposed to ionizing radiation is set forth in Ansi Standard N13.11. In film dosimetry it is necessary to retrieve individual film samples and position it precisely for reading by a densitometer. In such manner, the measurement of total dose of nuclear radiation received at a given period can be measured. Typically, the film is exposed in a dosimeter which is designed to be worn by people who may be at risk of receiving doses of radiation that need to be monitored. The dosimeter contains various materials precisely positioned relative to the film which attenuate the exposure made on the film by radiation. After processing, the portions of the film samples receiving the attenuated exposure are read by a densitometer. This data is then used to determine the amount of radiation received by the person while the dosimeter was worn. The film samples used are rather small, typically measuring 31 mm by 41 mm. Manually positioning each film sample so that the correct portions of the samples are properly aligned in the reading aperture of a densitometer can be tedious and time consuming. In addition, care must be taken to ensure that the density data generated for each sample is applied to the correct film sample.

There are a variety of apparatus known which teach handling or transfer of sheets or tags. One such apparatus is taught in U.S. Pat. No. 4,418,906 to Scott. Scott's apparatus includes a vacuum cup positioned at one end of a pivoting pick-up arm. The vacuum cup is used to extract an individual sheet or a stack of sheets releasably confined within an elevated magazine. The pick up arm is mounted on a pinion assembly and through the actuation of an indirectly coupled cam-control magnetic cylinder, the pinion assembly is driven along a rack. The gear affect created on the pinion and rack causes the pick up arm to rotate as it is translated downward along the rack. At full travel, the pick up arm has translated 180 degrees such that the individual sheet can be released from the vacuum cup into an underlying work holder of an associated and rapidly indexed turret.

U.S. Pat.No. 4,394,011 to Dalton teaches an automatic card or tag delivery apparatus. Card or tags are stacked horizontally in a hopper structure. The cards or tags are removed individually from the hopper structure by means of the vacuum arm having vacuum cups mounted thereto. The vacuum arm is pivotally mounted on to a slide block. An air cylinder is provided for driving horizontal movement of the slide block. Cam followers carried by crank arms on the vacuum arm engage fixed stops when the rod of the air cylinder is retracted to swing the vacuum arm to an upright position for retrieving an individual tag from the hopper. The tag is then transported to a horizontal position away from the hopper.

U.S. Pat. No. 5,031,892 to Steiger teaches an apparatus for removing blanks such as pieces of sheet metal from a pile and conveying them onward. A vertical stack of blanks is supported between a pair of guides. Individual blanks are retrieved from the bottom of such stacks by means of holding member which can be formed by suction cups. The holding members are carried by a support which is movable over a path defined by S-shaped guides to thereby transport the blank both downward away from the stack and laterally to conveying members.

The prior art fails to teach a system in which film samples can be individually retrieved from a source and reoriented from a first arm and transferred to a second arm such that the film sample can be precisely positioned on a horizontal plane to allow reading thereof for the operation of another device such as a densitometer. Further, the prior art does not teach the automatic discard of such samples into appropriate bins depending upon the information read therefrom.

SUMMARY OF THE INVENTION

It is therefore an object of the present invention to provide an apparatus for automatically retrieving individual film samples from a stack and precisely positioning such film samples at the reading aperture of a densitometer.

Another object of the present invention is to provide an apparatus for holding a dental film sample in a way that leaves the majority of the sample free to be measured by an instrument such as a densitometer.

A further object of the present invention is to provide an apparatus for positioning the film sample that enables a measuring device like a densitometer to measure specific portions of the sample.

Yet another object of the present invention is to provide an apparatus which allows for the identification of each film sample.

Briefly stated, these and numerous other features, objects and advantages of the present invention will become readily apparent upon a reading of the detailed description, claims and drawings set forth herein. These features, objects and advantages are accomplished by providing an apparatus in which film samples horizontally stacked in a magazine are removed individually from by means of a vacuum pad supported on a first pivot arm rotatable, in a first plane. The first pivot arm and a second pivot arm are mounted on a slide block. Through movement of the slide block, an individual film sample is engaged by the vacuum pad on the first pivot arm and removed from the magazine. After removal the pivot arm is rotated to reorient the film samples such that it lies in a horizontal plane. The second arm pivots in a plane perpendicular to the plane of rotation of the first pivot arm. There are gripping jaws mounted to the distal end of the second arm. Through the operation of the somewhat flexible gripping jaw, the film sample is grasped by one edge thereof. Through operation of the second pivot arm and the slide block, the individual film sample can be precisely positioned in a horizontal X-Y coordinate system for the performance of a subsequent operation such as reading by a densitometer.

The apparatus of the present invention can be made to incorporate other devices such as a bar-code reader which can be positioned to scan each individual sample for coded identification information specific to each sample. Therefore, the apparatus of the present invention ensures that density information is collected from the correct portion of the film sample, and further ensures that the data generated is correctly attributed to the proper sample. In addition, the second pivot arm of the present invention can be made to discard samples into a bin having one or more chambers allowing the operator to quickly collect and identify samples that have been successfully read by the densitometer and distinguish them from those samples that may have been improperly read, or which did not hold the correct coded identification information.

BRIEF DESCRIPTION OF THE DRAWINGS

FIG. 5 is a perspective view of the piston block which is part of the film sample magazine.

FIG. 6 is a side elevation of the sample positioning assembly with the sample removed therefrom and the jaws residing in a closed position (the bolts and coil springs have been omitted for clarity).

FIG. 7 is a side elevation of the sample positioning assembly with the sample removed therefrom and the jaws residing in an open position (the bolts and coil springs have been omitted for clarity).

FIG. 8 is a front elevation of the film sample positioning assembly holding a sample in vertical alignment with the aperture of a densitometer proximate to the reading plane of the densitometer.

FIG. 9 is a front elevation of the film sample positioning assembly wherein the pressure arm of the densitometer has engaged the film sample and pressed it against the reading plane of the densitometer thereby causing the rotating arm of the assembly to tilt.

DETAILED DESCRIPTION OF THE PREFERRED EMBODIMENT

Figure 1:
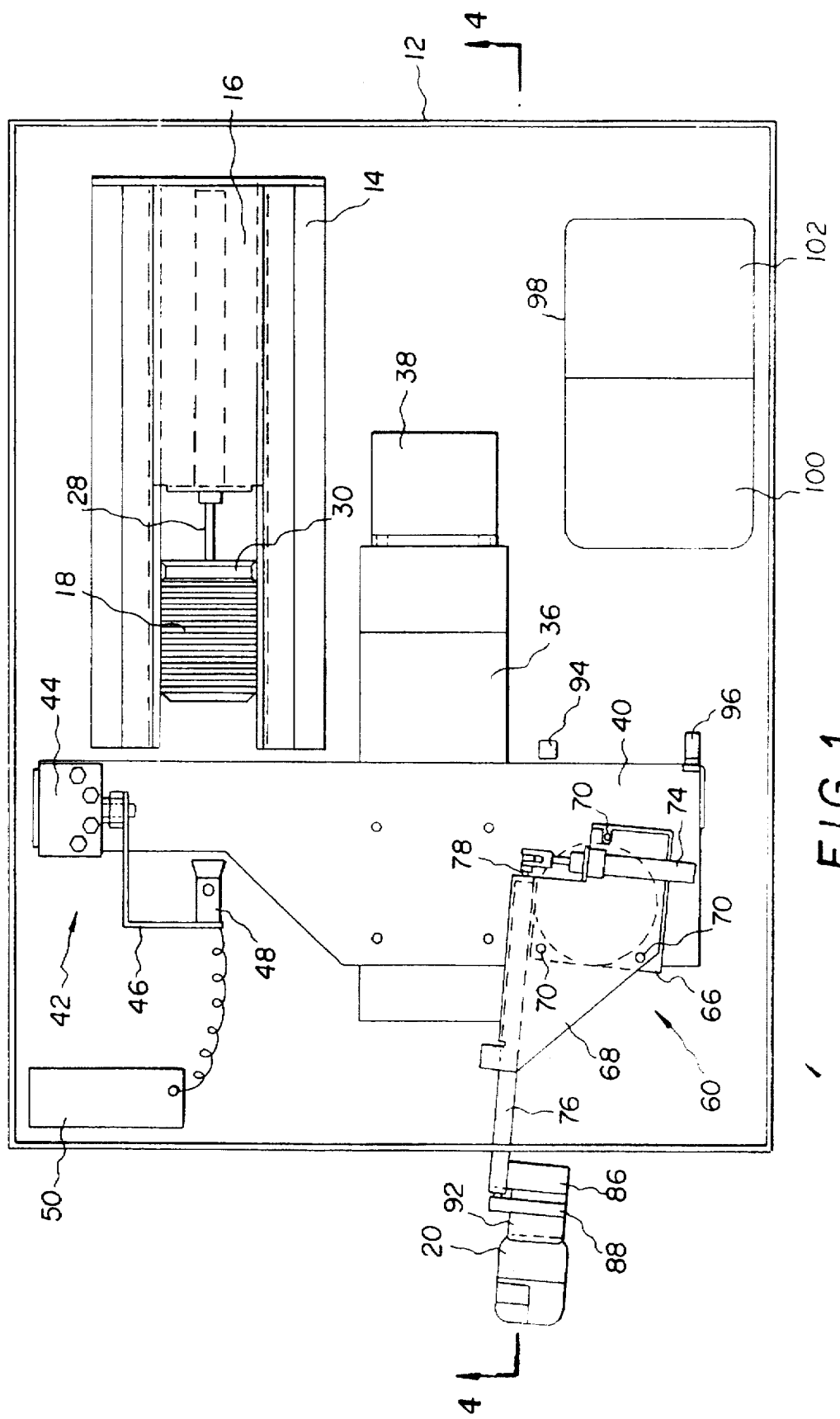
FIG. 1 is a top plan view of the film sample positioning apparatus of the present invention with the bar code reader removed therefrom for purposes of clarity.
Figure 2:
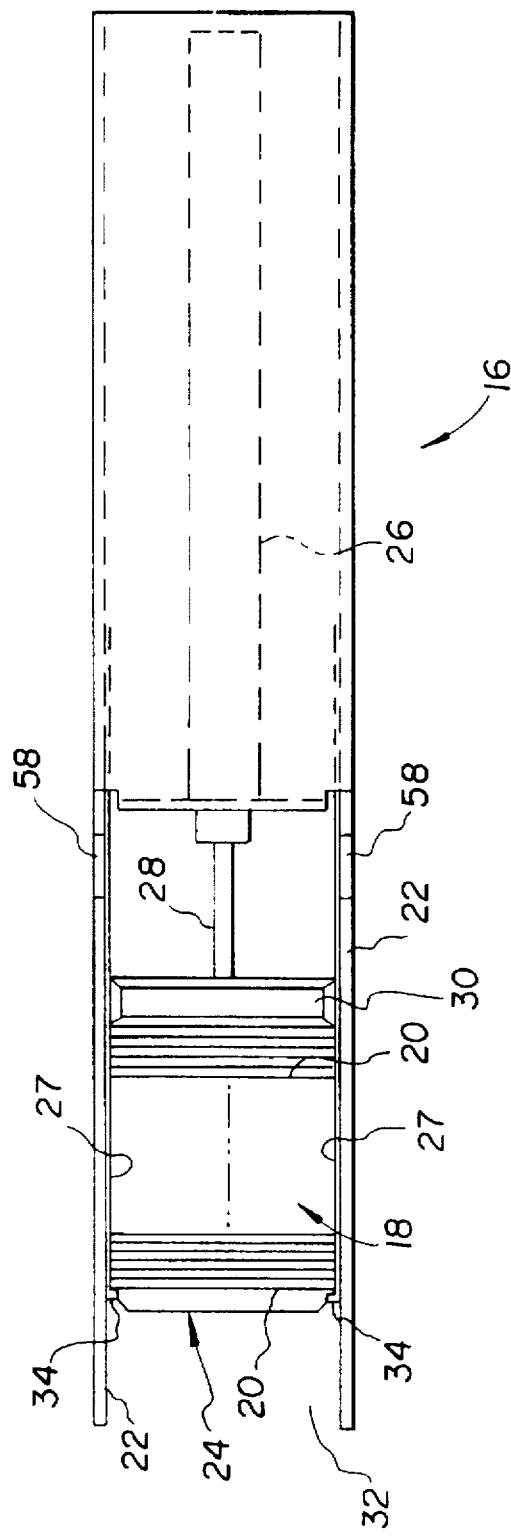
FIG. 2 is a top plan view of the film sample magazine.
Figure 3:
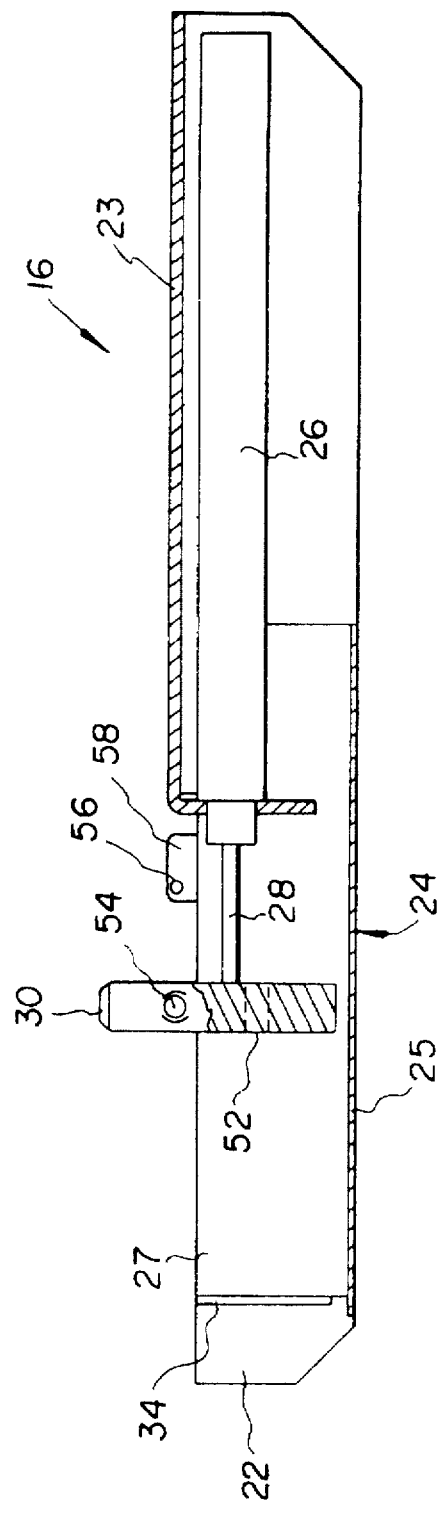
FIG. 3 is a cross-sectional view of the film sample magazine taken along line 3—3 of FIG. 2.

Turning first to FIG. 1, there is shown a plan view of the automatic film sample positioning apparatus 10 of the present invention. The apparatus 10 includes a frame or housing 12. Within housing 12 there is a magazine holder 14 in which magazine 16 can be manually inserted. Magazine 16, shown more clearly in FIGS. 2 and 3, is configured to hold a horizontal stack 18 of film sample 20. Magazine 16 includes a pair of opposing guide rails 22 and an integrally formed top wall 23. Affixed between guide rails 22 is a frame 24 that is generally U-shaped in cross section and sized slightly larger than the dimensions of film sample 20. Frame 24 includes a bottom wall 25 and side walls 27. Magazine 16 further includes a fixed cylinder 26 providing residence for a spring biased rod 28. Affixed to spring biased rod 28 is piston block 30. Spring biased rod 28 urges piston block 30 toward the dispensing end 32 of magazine 16. Projecting inwardly from side walls 27 are fingers 34 which engage the lead sample 20 within horizontal stack 18 and thereby retain horizontal stack 18 within magazine 16 for individual removal therefrom through the dispensing end 32. The fingers 34 are sized to project far enough into magazine 16 to provide a sufficient load bearing surface to overcome the force generated by the spring biased rod 28 to thereby retain the horizontal stack 18 within magazine 16. However, fingers 34 must be narrow enough to allow individual film samples 20 to deform or flex and move past fingers 34 when a sufficient pulling force is applied to the surface of a lead film sample 20 thereby allowing the apparatus 10 to retrieve individual samples 20 through dispensing end 32.

Figure 4:
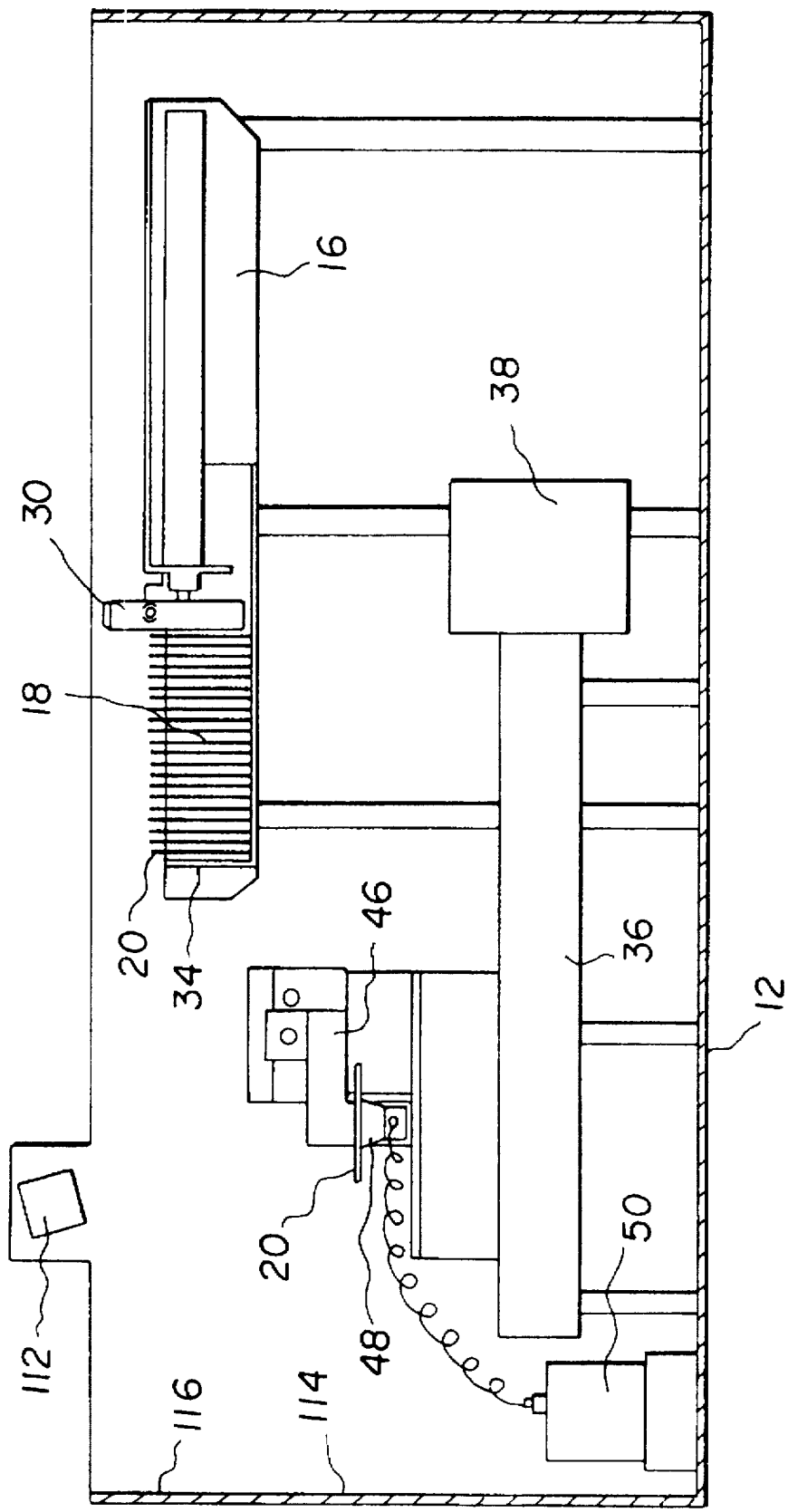
FIG. 4 is a cross-sectional view of the film sample positioning apparatus of the present invention taken along line 4—4 of FIG. 1 with the sample positioning assembly removed therefrom for the purpose of clarity.

Also mounted within the frame 12 is a linear slide 36 driven by motor 38 (See FIGS. 1 and 4). Linear slide 36 preferably includes a slide block slidably mounted on a pair of guide rods. The slide block must be capable of fine resolution linear travel along the guide rods. This can be accomplished with a threaded drive shaft extending from motor 38, the threaded guide shaft engaging a threaded receptacle in the slide block. A suitable linear slide 36 for use with the present invention is linear slide model No. RMS-400-SM as manufactured by New England Affiliated Technologies of Lawrence, Mass. Attached to the movable portion (slide block) of linear slide 36 is bracket 40. Affixed to one end of bracket 40 is sample acquisition assembly 42. Sample acquisition assembly 42 is comprised of a motor 44 having an arm 46 with the proximal end of arm 46 attached to motor 44. The distal end of arm 46 has a vacuum pad 48 projecting therefrom. Vacuum pad 48 is connected to a vacuum generator/sensor 50. One vacuum generator/sensor device which has been found to be adequate in the practice of the present invention is model CBA-10-HRB-24DC-BD as manufactured by Convum Myotoku of Tokyo, Japan. Through operation of linear slide 36 driven by motor 38, bracket 40 can be caused to move toward magazine 16 such that vacuum pad 48 will engage the lead film sample 20 of horizontal stack 18 maintained in magazine 16. The vacuum pressure supplied by vacuum generator 50 through vacuum pad 48 is sufficient to retrieve the lead sample film 20 from magazine 16 when motor 38 drives bracket 40 away from magazine 16. The vacuum supplied is sufficient to retain the lead sample film 20 on vacuum pad 48 as the lead sample 20 is flexed and deformed to move past fingers 34. If magazine 16 is empty, then vacuum pad 48 will move to engage the lead surface of piston block 30 which is shown in greater detail in FIG. 5. Note that piston block 30 includes a bore 52 therethrough which aligns with vacuum pad 48 when vacuum pad 48 is rotated to the position to retrieve film samples 20 from magazine 16. In such manner, when magazine 16 has been depleted of all of the film samples 20 retained therein, the vacuum generator/sensor 50 will sense that a sample 20 is not present because vacuum pad 48 is no longer sealed against the surface but instead is drawing air through bore 52. This will cause automatic operation of the apparatus 10 of the present invention to cease until a new magazine 16 containing a fresh horizontal stack 18 is inserted in magazine holder 14.

To aid in the loading of a horizontal stack 18 of film samples 20 in a magazine 16, piston block 30 has a spring loaded detent mechanisms 54 projecting from each side thereof. Spring loaded detent mechanisms 54 acts in conjunction with orifices 56 in ears 58 which project upward from guide rails 22. In such manner, an operator can manually press piston block 30 to overcome the force provided by a spring biased rod 28 such that spring loaded detent mechanisms 54 insert into orifices 56 thereby retaining piston block 30 in a fully retracted position. The operator can then load a plurality of film samples 20 into magazine 16, preferably about 300 film samples. Once the magazine 16 has been loaded the operator can manually push piston block 30 toward the film samples thereby overcoming the latching force generated by spring loaded detent mechanisms 54 such that spring biased rod 28 pushes the entire horizontal stack 18 toward dispensing end 32 with the lead film sample 20 pressed against fingers 34. An acceptable spring loaded detent mechanism 54 for use in the practice of the present invention is model No. M55 as manufactured by Vlier Enerpac of Burbank, Calif.

As depicted in FIG. 1, mounted to the opposite end of bracket 40 opposite sample acquisition assembly 42 is sample positioning assembly 60 (See also FIGS. 6 through 9). Sample positioning assembly 60 includes a microstepping motor 62. Connected to the drive shaft 64 of motor 62 is table member 66. There is an arm bracket 68 which is attached to table member 66 by means of machine bolts 70. A coiled compression spring 72 encircles the shank of each of the machine bolts 70. Attached to the top surface of arm bracket 68 is the pneumatic cylinder 74. Extending from arm bracket 68 is arm 76 which is generally tubular in configuration and includes an axle 78 extending therethrough. Axle 78 is connected at one end thereof to crank 80 which is, in turn, connected by means of pin 82 to piston rod 84 of the pneumatic cylinder 74. Projecting from the distal end of arm 76 is fixed lower jaw 86. Connected to the distal end of axle 78 is pivoting upper jaw 88. Fixed lower jaw 86 includes a lower plate member 90. Pivoting upper jaw 88 includes an upper plate member 92. Upper and lower plate members 90, 92 are preferably fabricated from spring steel (10/1000 inch thickness). Lower plate member 90 is rigidly attached to lower jaw 86, upper plate member 92 is pivotally attached to upper jaw 88 by means of screw 93. This ability to pivot allows upper jaw 88 and upper plate member 92 to be self seating when sample 20 is grasped between lower and upper plate members 90, 92.

Mounted in fixed positions within housing 12 are sensors 94, 96. Sensors 94, 96 are preferably optical type sensors. Sensor 94 allows the apparatus 10 of the present invention to measure precisely the amount of linear travel of bracket 40 along linear slide 36. Sensor 96 allows the apparatus 10 of the present invention to determine precisely the amount of rotational movement imparted to arm 76 by means of motor 62.

Also located within housing 12 is a bin 98 divided into at least two compartments 100, 102. Compartments 100, 102 serve as receptacles into which film samples 20 can be discarded. Bin is preferably removable from frame 12 to allow the opertor to easily empty bins 100, 102.

The apparatus 10 of the present invention is, of course, controlled by a computer (not shown). Any computer with digital input/output capability and capability for communicating with the motors, densitometer and bar code reader should be acceptable. The computer must, of course, also have math and trigonometry capability. Computer control of the apparatus 10 of the present invention makes all operations performed thereby automatic. Other then starting the operation of the apparatus 10 and the densitometor, the only manual operations required by an operator are the placement of film samples 20 in magazine 16 and the insertion of magazine 16 into the magazine holder 14. Also, an operator will ultimately have to empty bin 98 of discarded film samples 20. It should be recognized that the apparatus 10 can be electronically coupled to the densitometer thereby allowing the operator to begin operation through activation of a single switch.

Figure 10:
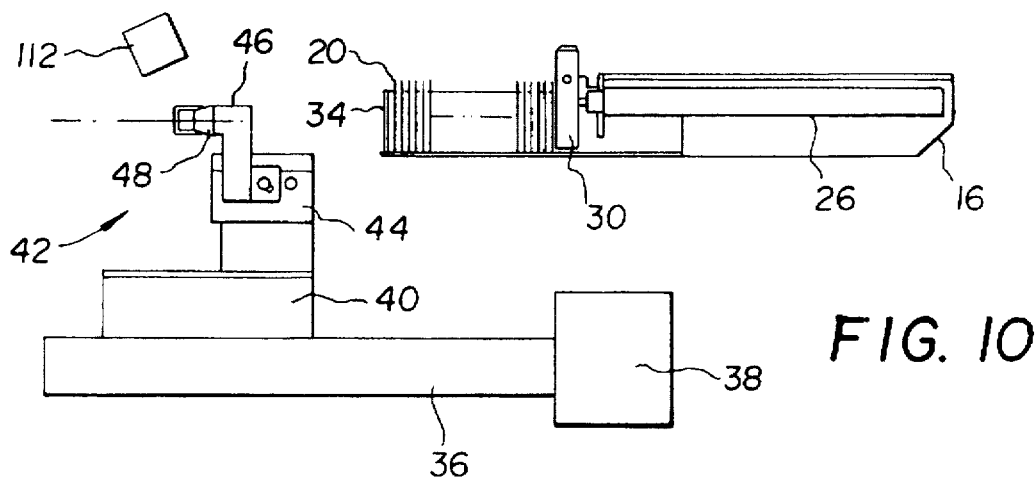
FIG. 10 is a schematic side elevation showing the relative positions of the sample acquisition assembly, the magazine and the bar code reader when the sample acquisition assembly is positioned ready to retrieve a sample.
Figure 11:
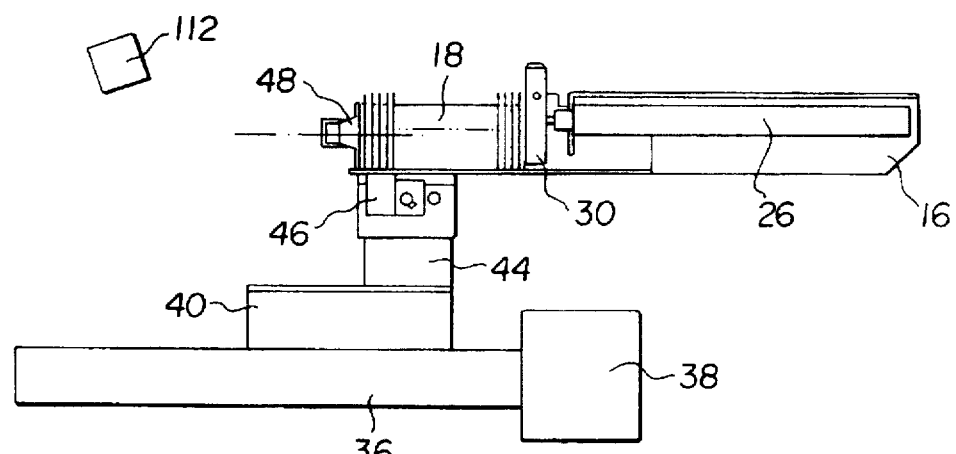
FIG. 11 is a schematic side elevation showing the relative positions of the sample acquisition assembly, the magazine and the bar code reader when the sample acquisition assembly has moved the vacuum pad into engagement with the lead sample contained within the magazine.

Once a magazine 16 containing film samples 20 has been inserted into magazine holder 14, operation can commence. At this point, the relative position of the sample acquisition assembly 42 and magazine 16 is shown in FIG. 10. Sequentially, apparatus 10 of the present invention operates such that linear slide 36 moves bracket 40 and, consequently, sample acquisition assembly 42 toward magazine 16 such that vacuum pad 48 engages the lead film sample 20 of horizontal stack 18 (See FIG. 11). The vacuum supplied by vacuum generator/sensor 50 allows sample acquisition assembly to retrieve or extract the lead film sample 20 when linear slide 36 moves bracket 40 away from magazine 16. Although the film sample 20 has been separated from horizontal stack 18, it is retained in the same orientation on vacuum pad 48 as those film samples 20 remaining within magazine 16 retrieving the individual film samples 20 in this manner ensures that the film samples 20 remaining in magazine 16 will not be disturbed from their orientation and position other than advancing in magazine 16. Motor 44 then causes arm 46 to rotate 90 degrees such that vacuum pad 48 is directed vertically upward. This reorients the individual film sample 20 held on vacuum pad 48 to reside in a horizontal plane (See FIG. 12). Microstepping motor 62 then rotates arm 76 toward vacuum pad 48 with pivoting upward jaw 88 residing in an open position away from fixed lower jaw 86. Rotation of arm 76 results in a portion of lower plate member 90 residing immediately beneath one end of film sample 20 held on vacuum pad 48. Pneumatic cylinder 74 is then actuated causing pivoting upper jaw 88 to move toward fixed lower jaw 86 resulting in an end portion of film sample 20 being grasped between lower plate member 90 and upper plate member 92.

Figure 12:
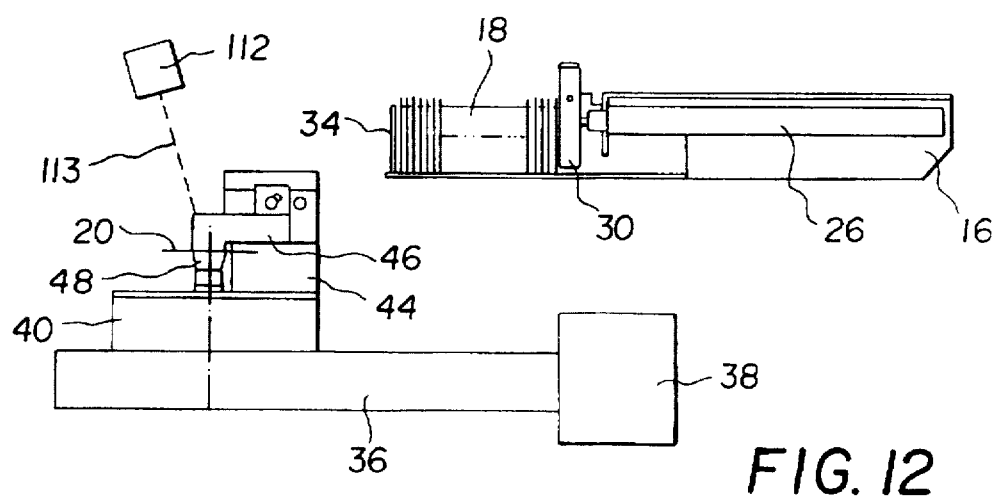
FIG. 12 is a schematic side elevation showing the relative positions of the sample acquisition assembly, the magazine and the bar code reader when the sample acquisition assembly has acquired a film sample from the magazine and rotated such sample to reside in a horizontal plane for reading by the bar code reader and subsequent transfer to the film sample positioning assembly.
Figure 13:
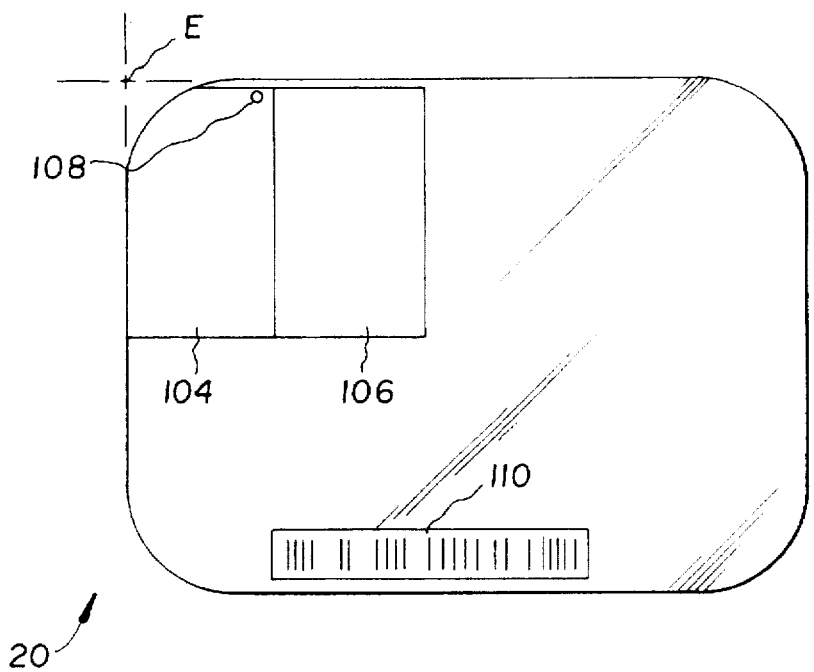
FIG. 13 is a plan view of an individual film sample.

Each individual film sample 20 shown in detail in FIG. 13 may include multiple dosimetry zones 104, 106, each of which may need to be read by the densitometer. In addition, the individual film samples 20 will include a reference mark 108 to ensure that the operator places all of the samples 20 into the magazine 16 in the same orientation. Further, the individual samples 20 may include a coded information zone 110 allowing each sample 20 to be individually identified by the computer. The coded information zone 110 is preferably a bar code and the apparatus 10 of the present invention can have incorporated therein a bar code reader 112. Through manipulation of the sample 20 held between lower and upper plate members 90, 92 through the actions of linear slide 36 and rotation of arm 76 by microstepping motor 62, the coded information zone 110 is caused to pass under the bar code reader 112. Alternatively, bar code reader 112 can be positioned to read the coded information zone 110 while the sample 20 is held in a horizontal orientation by vacuum pad 48 as shown in FIGS. 4 and 12. Bar code reader 112 is an optical scanner which projects a beam along dotted line 113. Bar code reader 112 thereby identifies the specific sample 20 to the computer.

There is a slot or opening 114 in side wall 116 of housing 12 through which arm 76 can extend. In such manner, sample 20 can be held in a position outside housing 12 proximate to the reading plane of the densitometer. The computer then precisely positions film sample 20 through the control of linear slide 36 and by microstepping motor 62 such that each dosimetry zone 104, 106 is sequentially located beneath the reading aperture of some suitable device such as a densitometer. Once each dosimetry zone has been read, linear slide 36 retracts sample positioning assembly 60 back into housing 12, and through rotation of microstepping motor 62, sample 20 can be discarded into one of the compartments 100, 102 of bin 98. By using multiple compartments, a sort can be automatically performed by the computer for the benefit of the operator such that those samples 20 which have been successfully read can be dumped into one of the compartments 100, 102, and those samples 20 which have not been successfully read by the densitometer can be dumped into another of the compartments.

As mentioned above rotation of arms 76 and lateral movement of linear slide 36 allows precise positioning of sample 20 in close proximity to the reading plane 118 of the densitometer (See FIGS. 8 and 9). Once the sample 20 is precisely positioned, the pressure arm 120 of the densitometer moves down to engage the sample 20 to press the sample 20 against the reading plane 118. Pressing sample 20 against the reading plane 118 causes arm bracket 68 and arm 76 to tilt such that the rear end of arm bracket 68 separates from table member 66. This is enabled by coil compression springs 72 working in conjunction with machine bolts 70 such that arm brackets 68 and arm 76 pivot about the lead edge 122 of table member 66 as depicted in FIG. 9. The lead edge 122 is perpendicular to arm 76.

Once a film sample 20 has been discarded into bin 98, the next film sample 20 is automatically retrieved from magazine 16 and the process repeated until magazine 16 has been emptied of samples 20.

Although the apparatus 10 of the present invention has been described as being used in conjunction with a densitometer for reading film dosimetry samples, it will be recognized by those skilled in the art that apparatus 10 of the present invention can be used to handle other types of film samples. For example, samples could be handled by the apparatus 10 of the present invention for the purpose of image scanning, exposure, physical examination, or similar operations.

Figure 14:
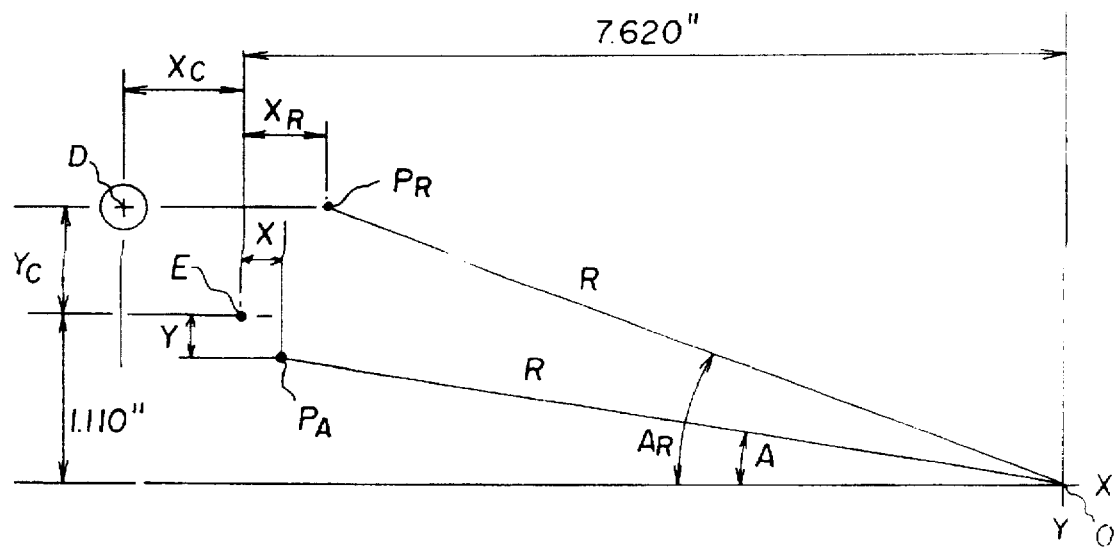
FIG. 14 is a schematic depicting the geometry of the operation of the film sample positioning assembly of the present invention.

In order to precisely position each film sample 20 the computer calculates the required movements of linear slide 36 and microstepping motor 62. This calculation is performed in accordance with the diagram shown in FIG. 14. In such diagram, E represents the reference point adjacent a sample 20 residing at the intersection of lines projecting from the side edges of the sample 20 (See FIG. 13). D represents the actual position of the aperture of a densitometer. R is the distance from the center of rotation O of arm 76 to the location to be read on sample 20 by the densitometer. $P_A$ is the actual position of the location to be read by the densitometer on sample 20, and $P_R$ is the position of the location to be read by the densitometer on sample 20 after arm 76 is rotated through an angle equal to $A_R$-A. Note also that the X-axis is the base reference line for rotation of arm 76. Further, the diagram assumes an arm length and sample size such that E is located 1.110 inches from the X-axis and 7.62 inches from the Y-axis from the center of rotation O. The goal is to move the actual position of the location to be read on sample 20 to reside immediately beneath the actual position of the aperture of the densitometer. In other words, the apparatus 10 of the present invention must act to reposition $P_A$ along the Y-axis to be in alignment with D. This is accomplished first by rotating arm 76 such that the spot to be read is in line with D and the Y-axis. In other words, through rotation of arm 76, $P_A$ is relocated to $P_R$ thereby moving the spot to be read in the Y direction a distance equal to Y plus $Y_C$. Then the arm 76 is translated through operation of the linear slide 36 to move a distance $X_R$ plus $X_C$. The equations for determining the decree of rotation of arm 76 and the amount of linear translation of arm 76 necessary are as follows:

$$R = \sqrt{(7.620 - X)^2 + (1.110 - Y)^2} \quad (1)$$

$$A = \text{Arcsin}\left(\frac{1.110 - Y}{R}\right) \quad (2)$$

$$A_R = \text{Arcsin}\left(\frac{1.110 + Y_C}{R}\right) \quad (3)$$

$$X_R = 7.620 - R \cdot \cos(A_R) \quad (4)$$

Through solution of these equations, the computer controls the microstepping motor 62 and motor 38 driving linear slide 36 to thereby precisely position each film sample 20.

From the foregoing, it will be seen that this invention is one well adapted to attain all of the ends and objects here in above set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter here in set forth and shown in the accompanying drawings is to be interpreted as illustrative and not in a limiting sense.

We claim:

1. An apparatus for handling and automatically positioning generally planar film samples comprising:
   (a) a first arm having a proximal end and a distal end, said proximal end being connected to a means for rotating said arm in a first plane, said distal end having a vacuum pad affixed thereto for acquiring a generally planar film sample from a source;
   (b) a rotatable second arm;
   (c) clamping means attached to a distal end of said second arm, said clamping means acquiring the generally planar film sample from said vacuum pad and holding the generally planar film sample in a second plane which is generally perpendicular to said first plane;
   (d) means for translating said second arm to thereby translate the generally planar film sample in said second plane; and
   (e) means for precisely positioning the generally planar film sample in said second plane through operation of said rotatable second arm and said means for translating.

2. An apparatus as recited in claim 1 wherein:
   said means for precisely positioning is a microprocessor controlling said second arm and said means for translating.

3. An apparatus as recited in claim 1 wherein:
   said source is a magazine which holds a stack of the film samples, said magazine including a biasing means to urge the stack against a stop reference, said magazine residing in a magazine holder mounted in a housing, said first and second arms being supported in said housing.

4. An apparatus as recited in claim 1 wherein:
   said means for translating is a linear slide block mechanism, said second arm being mounted to said linear slide block mechanism.

5. An apparatus as recited in claim 4 further comprising:
   (a) a first sensor means for measuring lateral movement of a movable portion of said linear slide block mechanism; and
   (b) a second sensor means for measuring rotational movement of said second arm.

6. An apparatus as recited in claim 1 wherein:

said means for translating is a linear slide block mechanism including a movable portion, both said first arm and said second arm being attached to said movable portion.

7. An apparatus as recited in claim 1 wherein:

said clamping means includes an upper jaw and a lower jaw, both said upper jaw and said lower jaw being substantially planar, non-rigid members.

8. An apparatus as recited in claim 1 further comprising:

a magazine holder for supporting a magazine therein, said magazine holder mounted within a housing, said first and second arms being supported in said housing, said magazine maintaining a plurality of film samples in alignment and in a predetermined orientation.

9. An apparatus as recited in claim 1 wherein:

said clamping means includes an upper jaw and a lower jaw, both said upper jaw and said lower jaw being substantially planar members.

10. An apparatus as recited in claim 9 wherein:

said upper jaw is pivotable and said lower jaw is fixed.

11. An apparatus as recited in claim 1 further comprising:

a bar code reader for reading information encoded on a surface of the film sample.

12. An apparatus as recited in claim 1 further comprising:

(a) support member, said rotatable second arm being pivotally supported from said support member allowing said rotatable second arm to be skewed from said second plane; and (b) biasing means for biasing said rotatable second arm to a normal position where the generally planar film sample resides in said second plane.

13. An apparatus for handling and automatically positioning film samples comprising:

(a) a first arm having a proximal end and a distal end, said proximal end being connected to a means for rotating said arm in a first plane, said distal end having a vacuum pad affixed thereto for acquiring a film sample from a source;

(b) a second arm rotatable in a second plane which is generally perpendicular to said first plane; (c) clamping means attached to a distal end of said second arm, said clamping means acquiring the film sample from said vacuum pad and generally holding the film sample in said second plane; and (d) means for translating said second arm in said second plane such that, through operation of said rotatable second arm and said means for translating, the film sample can be precisely positioned in said second plane for a subsequent operation.

14. An apparatus as recited in claim 13 wherein:

said clamping means grasps said film sample at a peripheral edge thereof leaving substantially all of the film sample unobstructed during the subsequent operation, said clamping means continuing to hold the film sample during the subsequent operation.

15. An apparatus as recited in claim 13 further comprising:

(a) a support member, said second arm being pivotally supported from said support member allowing said second arm to be skewed from said second plane; and (b) biasing means for biasing said rotatable second arm to a normal position where the generally planar film sample resides in said second plane.

16. An apparatus for automatically positioning film samples comprising:

(a) a bracket;

(b) an arm supported by said bracket and having proximal and distal ends, said arm having a clamping means connected to said distal end for grasping a planar film sample at a peripheral edge thereof such that the planar film sample resides in a reference plane;

(c) means for rotating said arm to move the planar film sample across said reference plane;

(d) means for translating said means for rotating to translate the planar film sample in said reference plane; and (e) means for automatically controlling said means for rotating and said means for translating to thereby precisely position the planar film sample grasped by said clamping means at a location in said reference plane.

17. An apparatus as recited in claim 16 further comprising:

(a) a support member mounted to said means for rotating, said bracket being pivotally attached to said support member allowing said arm to be skewed from a normal plane of rotation; and (b) biasing means for biasing said arm to a normal position where said arm resides in said normal plane of rotation.

18. An apparatus for automatically positioning film samples comprising:

(a) an arm connected at a proximal end thereof to a support member;

(b) clamping means attached to a distal end of said arm for grasping a planar film sample at a peripheral edge thereof and holding the planar film sample to reside in a first plane;

(c) means for translating said support member and said arm to thereby translate the planar film sample in said first plane while said clamping means holds the planar film sample;

(d) means for rotating said arm to move the planar film sample across said first plane while said clamping means holds the planar film sample; and (e) means for automatically controlling said means for rotating and said means for translating to thereby precisely position the planar film sample grasped by said clamping means in said first plane.

19. An apparatus as recited in claim 18 further comprising:

means for delivering the film samples, one at a time, to said clamping means.

20. An apparatus as recited in claim 19 further comprising:

a magazine which holds a stack of the film samples in a predetermined orientation, said magazine including a biasing means to urge the stack against a stop reference.

21. An apparatus as recited in claim 20 wherein:

said clamping means includes an upper jaw and a lower jaw, both said upper jaw and said lower jaw being substantially planar members.

22. An apparatus as recited in claim 21 wherein:

said upper jaw is pivotable and said lower jaw is fixed.

* * * * *